US005339250A

United States Patent [19]

Durbin

[11] Patent Number: 5,339,250

[45] Date of Patent: Aug. 16, 1994

[54] INTERACTIVE NETWORK FOR REMOTELY CONTROLLED HOTEL VENDING SYSTEMS

[75] Inventor: Martin J. Durbin, Oak Forest, Ill.

[73] Assignee: Inn Room Systems, Inc., Sudbury, Mass.

[21] Appl. No.: 965,610

[22] Filed: Oct. 22, 1992

Related U.S. Application Data

[63] Continuation of Ser. No. 539,105, Jun. 15, 1990, abandoned.

[51] Int. Cl.[5] .......... G06F 15/21

[52] U.S. Cl. .......... 364/479; 221/9; 235/381; 340/825.35

[58] Field of Search .......... 364/479, 478, 401, 403; 235/381, 382, 382.5; 340/825.35; 221/2, 5, 7, 8, 9, 15; 194/217, 218, 241

[56] References Cited

U.S. PATENT DOCUMENTS

| | | | |
|---|---|---|---|
| 3,436,736 | 4/1969 | Platt et al. | 340/172.5 |
| 3,491,869 | 1/1970 | Utz | 194/2 |
| 3,556,343 | 1/1971 | Ungerman | 221/90 |
| 3,749,279 | 7/1973 | Ungerman | 221/97 |
| 3,979,017 | 9/1976 | O'Toole et al. | 221/7 |
| 4,237,537 | 12/1980 | Pitches et al. | 364/479 X |
| 4,553,211 | 11/1985 | Kawasaki et al. | 235/381 X |
| 4,598,810 | 7/1986 | Shore et al. | 194/205 |
| 4,629,090 | 12/1986 | Harris et al. | 221/7 |
| 4,687,119 | 8/1987 | Juillet | 221/101 |
| 4,706,794 | 11/1987 | Awane et al. | 364/479 X |
| 4,827,426 | 5/1989 | Patton et al. | 364/479 |
| 4,847,764 | 7/1989 | Halvorson | 364/479 X |
| 4,866,661 | 9/1989 | De Prins | 235/382 X |
| 4,872,541 | 10/1989 | Hayashi | 364/479 X |
| 4,951,308 | 8/1990 | Bishop et al. | 340/825.35 X |
| 4,992,940 | 2/1991 | Dworkin | 364/408 |
| 5,057,677 | 10/1991 | Bertagna et al. | 235/381 |
| 5,095,195 | 3/1992 | Harman et al. | 235/381 |

FOREIGN PATENT DOCUMENTS

| | | |
|---|---|---|
| 1536534 | 12/1978 | United Kingdom . |
| 2101982 | 1/1983 | United Kingdom . |
| 2135292 | 8/1984 | United Kingdom . |
| 2161630 | 1/1986 | United Kingdom . |

OTHER PUBLICATIONS

World Intellectual Property Organization PCT Application No. WO 88/00741, dated Jan. 28, 1988.

*Primary Examiner*—Joseph Ruggiero
*Attorney, Agent, or Firm*—Fitch, Even, Tabin & Flannery

[57] ABSTRACT

The hotel vending network includes a central control at the hotel main desk and a vending unit in each hotel guest room. The microprocessor controlled vending units include a display arrangement for displaying prices of articles to be rended and a user allocatable keyboard for use in article selection and final purchase from the vend unit. Each purchase is a cooperative action between the central control and a vend unit and is completed by an acknowledgment signal from the vending unit which signal is required before actual billing of a rended article occurs. The keyboard is also used to control service access to the vending unit by means of passwords assigned from the central control.

15 Claims, 3 Drawing Sheets

INTERACTIVE NETWORK FOR REMOTELY CONTROLLED HOTEL VENDING SYSTEMS

This application is a continuation, division, of application Ser. No. 07/539,105, filed Jun. 15, 1990, abandoned.

BACKGROUND OF THE INVENTION

This invention relates to hotel guest room vending networks and particularly to improvements in the interaction between the vending units and controllers of such networks to improve the services and features offered.

Hotel guest room vending arrangements began as a plurality of guest room vending units containing vendable articles which the hotel room guest could use at will. Periodically hotel personnel would inventory the guest room vending units to determine which articles had been used by the guests and report the use to the hotel front desk. The front desk then computed the charges for the used articles and added them to the guest bill of the user. When a guest checked out, a special inventory was required to provide accurate usage information for the guest's final bill. To improve guest room vending, automated systems have been produced which record the purchase events in the guest rooms and convey this information directly to a centralized computer which computes the customer's bill.

Automated reports to the centralized computer reduce the human participation required for inventories and improve the reliability of the actual inventory taken. The real convenience of operation for both the hotel staff and hotel guests provided by these prior automated systems is still limited, however. In one known system, the vending units are given certain control over vending unit operations by the incorporation of a microprocessor therein, but inventories are only periodically sent to the central controller resulting in a real time lag between actual and reported inventory. Such a time lag potentially causes under-billing by the hotel system for items used after the last inventory was accumulated or significant delays at checkout time so that a last minute inventory can be taken. Last minute delays can create significant problems at busy times when many guests are wanting to checkout. With another known system, the central computer is notified of each purchase at a vending unit as that purchase occurs so that the central control always knows of current purchases. However, with this arrangement, the system is subject to erroneous messages on the communication path between the central computer and the vending units.

Prior systems share other limitations in service. For example, such systems still rely on printed price lists in each guest room to notify the guests of the prices of articles in the vending units. Such price lists are frequently lost, resulting in guest confusion, and require expensive reprinting and delivery when prices in the vending units change. A need exists for an improved arrangement of notifying hotel guests of prices of articles to be vended.

Arrangements for permitting service access to the vending units for their restocking and maintenance are also important to the convenience of hotel room vending systems. Prior automated vending systems use physical locks and keys to permit internal access to the vending units by only service personnel. When keys are lost or stolen, expensive lock changes and key replacements are required. Clearly a need exists for a hotel vending network which improves arrangements for providing service personnel access to vending units.

Prior arrangements, operating under a limited communication protocol, transmitted information on the communication path and assumed that the transmitted information was properly received and responded to. Dependence on such assumptions resulted in systems in which spurious signals could be induced on the communication paths of the system and interpreted as real signals, such as a notice that an article had been vended. A need exists for a vending arrangement which avoids such responses to erroneous messages.

The prior automated guest room vending arrangements lack sufficient control arrangements at the vending units and a sufficient sophisticated communications protocol between the vending units and the centralized controller to meet the needs as set forth above.

SUMMARY OF THE INVENTION

A hotel vending network in accordance with the present invention comprises a plurality of vending units each with expanded capabilities over those heretofore provided and a communication link between the vending units and the centralized computer which improves existing services and permits new services and features to be provided by the network.

In a disclosed embodiment, each guest room vending unit includes a controller and a display device which is used by the intelligent vending unit to display the prices of articles to be vended. The prices of articles in the vending unit are transmitted from the central computer and stored in a memory in the controller of the vending unit. When a guest signals an interest in an article by pressing keys on a keyboard of the vending unit, the price of that article is displayed on the display device. By displaying price information at the vending unit, the printed notices which have previously been used to notify customers of prices need not be used. The price display at the vending units saves the expense of maintaining the notices and provides the customer with price information in a much more understandable manner. Additionally, prices can be updated at will by transmitting new prices from the central control for storage in the vending unit memory.

Price displaying at the vending units coupled with automated price updating permits pricing to be changed automatically by the central controller whenever price changes occur, rather than when a new printed list can be generated and delivered. Further, due to the improved communication now possible between the central controller and the vending unit controllers, prices need not be the same throughout the hotel. For example, one area of the hotel may be reserved for special customers and discount vending unit prices can be used in this special area. In other areas non-discounted prices may prevail. Price information can also be changed as a function of time. For example, the vending network disclosed herein can provide a "happy hour" for hotel guests by lowering the prices of certain articles to be vended for a period of time during the day.

Guest room vending units, in accordance with one aspect of the present invention, comprise a keyboard input device which permits service personnel to use passwords to gain service access to the vending units thereby avoiding the physical keys and locks of prior arrangements. Vending unit passwords are generated by the centralized controller and transmitted to the vending units to be stored therein. Service personnel enter a password at a vending unit keyboard and if the entered password matches its stored password, service access is permitted. The use of electronic passwords provides security at the vending units and changeability of passwords by centralized control protects against the loss of password security. Separate passwords for maintenance of the vending unit and for restocking the vending unit are provided in an embodiment for improved security.

The disclosed arrangement operates under a communication protocol which include prescribed message sequences to assure that messages are properly transmitted, received and responded to. The disclosed protocol includes error check codes and message acknowledgment signals Which make responses to spurious signals on the communication paths virtually impossible. The sequence of actions undertaken during a vending operation in the described arrangement makes advantageous use of the improved communications protocol. A vending operation comprises transmitting from a vending unit to the central controller, a request to vend an article, returning a permission signal from the central controller to the requesting vending unit, permitting the requested purchase at the vending unit responsive to the permission from the central control, and sending an acknowledgment signal back to the central control to notify it that the purchase has been completed. By the return of the final acknowledgment signal from the vending unit, the central control knows with certainty that the purchase was completed. Advantageously, billing of the purchase occurs only after the acknowledgment of the purchase has been received at the central control.

DETAILED DESCRIPTION OF THE PREFERRED EMBODIMENT

Figure 1:
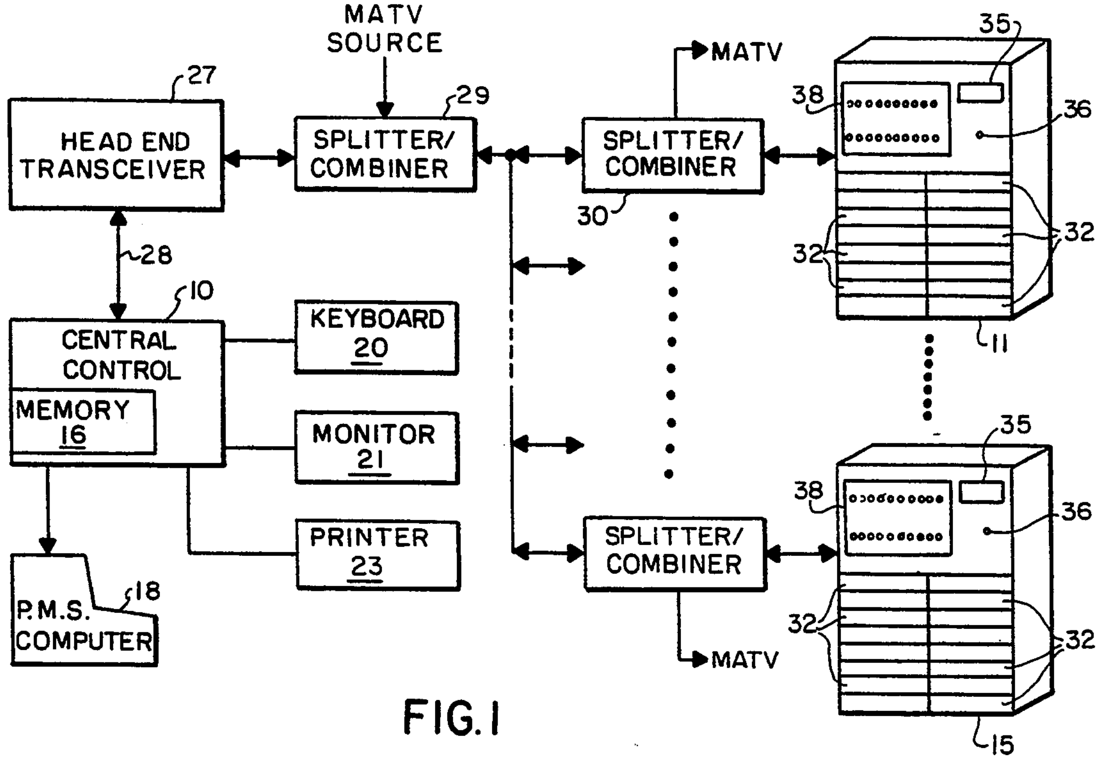
FIG. 1 is a block diagram of a vending network embodying the present invention.

FIG. 1 is a block diagram of a hotel room vending network including a central controller 10 and a plurality of vending units 11 through 15. The exact number of vending units depends of course on the hotel size but may be as large as 1,000. Each of the vending units 11 through 15 in the present embodiment is placed in a different hotel guest room so that the occupants in each room have the ability to conveniently purchase articles such as drinks and snacks. Central controller 10 controls the overall operation of the network, keeps records of the articles rended from each of the vending units 11 through 15, and provides information to a property management system (PMS) computer 18 of significant events such as purchases at the individual vending units. In the present embodiment central controller 10 comprises an IBM System II Model 30/35 personal computer and its memory represented at 16.

Central controller 10 is connected to a keyboard 20, a monitor 21 and a printer 23. The keyboard 20 is used in the normal manner to enter information and commands into the central controller 10. The monitor 21 provides a visual interface arrangement for the operator of the system, and printer 23 can be used to provide hard copies of reports such as audits of the use of the various vending units 11 through 15 or statements of the inventory of those same vending units.

Central controller 10 is advantageously placed in the offices of the hotel and is, from time to time, referred to as the front desk controller. Vending units 11 through 15, each of which has a unique address, and central controller 10 communicate over the master television distribution network (MATV) of the hotel. When central controller 10 wishes to communicate with a vending unit e.g. 11, it formulates a digital message and conveys that message to a head end transceiver 27 over an RS 422 link 28. Head end transceiver 27 appends a preamble to the message, converts the message to a frequency shift keying (FSK) format and transmits the message in FSK to all vending units 11 through 15 via an MATV splitter/combiner 29. Another splitter/combiner 30 in each of the guest rooms separates the MATV signal for application to a television and the FSK message for application to the vending unit in the same guest room.

Head end transceiver 27 both sends and receives FSK messages from (to) vending units 11 through 15. Messages from head end transceiver 27 are transmitted to the vending units at frequencies around 110 MHz and messages from the vending units 11 through 15 to the head end transceiver 27 are transmitted around 26.75 MHz. Both of these frequencies are readily conveyed by standard MATV equipment.

Each of the messages from central controller 10 includes an address portion identifying a unique one of the vending units 11 through 15. All vending units 11 through 15 receive each message transmitted from central controller 10, and decode its address portion. The particular vending unit e.g. 11 identified by the address of the message acts on the received message. Message decoding is performed by a vending control unit 75 (FIG. 2) operating in accordance with instructions and data stored in a memory 77.

Each vending unit 11 through 15 also transmits messages to central controller 10. To transmit such a message, the vending unit controller 75 of a given vending unit generates a digital message to be transmitted and includes with that message its own address so that central controller 10 knows which vending unit has transmitted a message. No message destination is required since only the head end transceiver 27 receives messages of the frequency transmitted by the vending units. A message formulated by a vending unit controller is encoded into FSK signals around 26.75 MHz by a vending unit transceiver 76 and applied to the MATV network via a splitter/combiner 30. This message is conveyed by the MATV network to the head end transceiver 27 where it is decoded oral controller 10.

FIG. 1 shows the physical features of vending unit 11. All vending units consist of substantially the same components. Vending unit 11 comprises sixteen vending doors 32 each of which is stamped with a number from 1 to 16. Behind each of the vending doors are articles to be sold by the vending unit 11. Vending unit 11 also includes a keyboard 38 comprising 20 push button keys each printed with a number from 1 to 20. The keys of the keyboard are pressed by a potential purchaser during a vending sequence and are pressed by service personnel to gain internal access to the vending unit. Vending unit 11 also includes a display module 35 of a type well known in the art, and a purchase button 36 which is used by a purchaser to complete the purchase of an item from vending unit 11.

Figure 2:
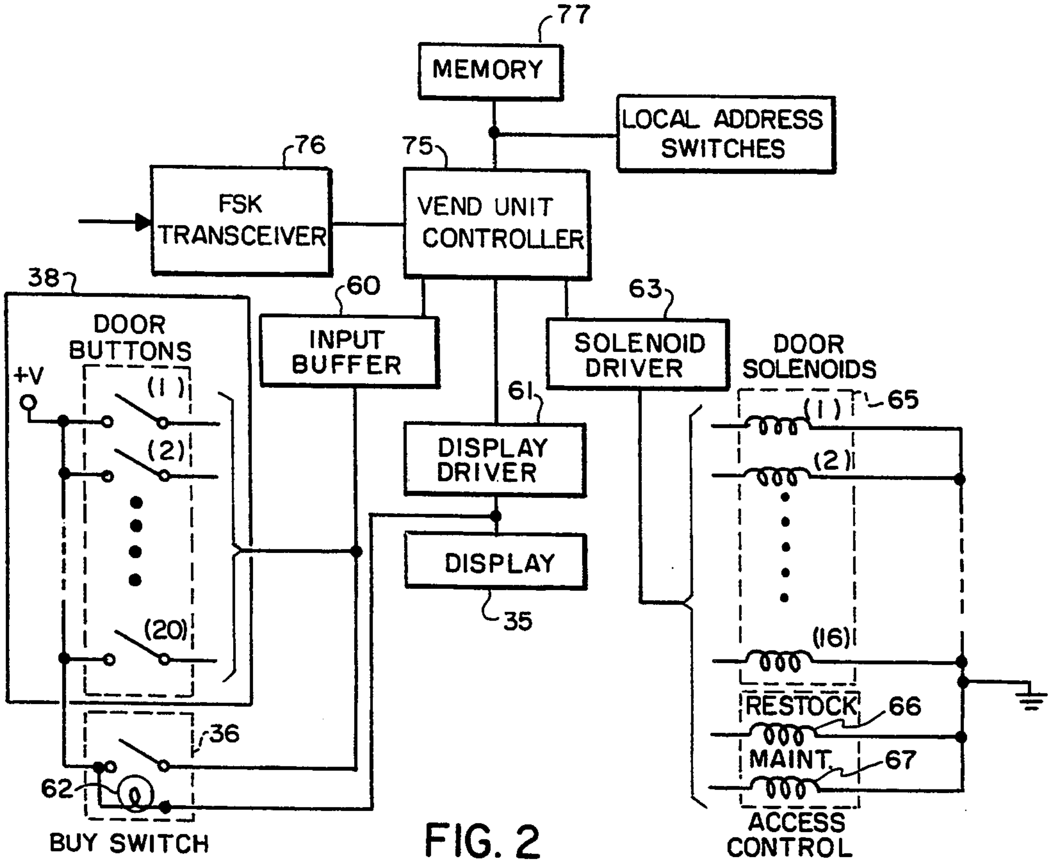
FIG. 2 is an electrical block diagram of portions of the vending units shown in FIG. 1.

The interaction of the vending unit physical features and vending unit controller 75 is illustrated in FIG. 2. The exemplary vending unit includes an input buffer 60 which is electrically connected to the electrical contacts of each of the push buttons of keyboard 38 (next to each of the electrical contacts of keyboard 38 is a number in brackets to indicate the number printed on that button). Vending unit controller 75 periodically scans the state of each of the electrical contacts of keyboard 38 via input buffer 60 to determine if any has been pressed or released since the last scan. Similarly, vending unit controller 75 scans the state of purchase button contacts shown at 36. Scanning the state of the various electrical contacts via input buffer 60 provides information on which to basis vending actions and is described in greater detail later herein.

Vending unit controller 75 also transmits signals within its vending unit to control the display, the opening of vending doors and access to the vending unit by service personnel. The displayed information is controlled by a display driver/clock circuit 61 which receives instructions from the vending unit controller 75 to control the display 35 to display visual information. One type of visual information is the time of day which is set by the vending unit controller 75 and is controlled by clock circuitry of the display driver/clock circuit 61 to display accurate time. A second type of information displayed is price information regarding the articles held by the vending unit. To display a price, vending unit controller 75 transmits price information to display driver 61 which responds by replacing the time of day display with price information. Vending unit controller 75 also controls the vending of articles and service personnel access to the vending unit via a solenoid driver 63. Such control is exercised by transmitting to driver 63 a code specifying a particular one of door solenoids 65 or access control solenoids 66 or 67. Solenoid driver 63 decodes the encoded signals from vending unit controller 75 to identify the specified solenoid and applies an actuating voltage to the identified solenoid. The identified solenoid is actuated by the activating voltage to release a catch or latch and permit access to the vending unit. The particular manner in which the solenoid driving capabilities are used to provide vending services is discussed in detail later herein.

Figure 3:
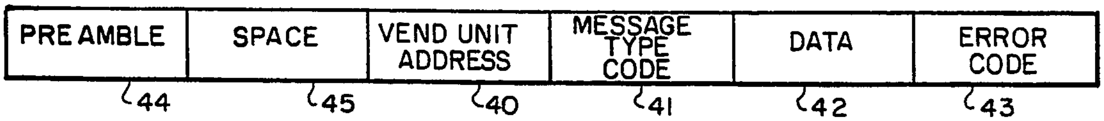
FIG. 3 is a representation of messages exchanged on the network of FIG. 1.

The general format of messages exchanged between the central controller 10 and vending units 11 through 15 is shown in FIG. 3. Each message includes four message content fields 40 to 43 and two FSK protocol fields 44 and 45. Vend unit address field 40 identifies the vending unit which is the source of the message when the message is generated by a vending unit (26.75 MHz) and identifies the destination of the message when the message is generated by central controller 10 (110 MHz). Message type code field 41 identifies the type of message being sent. The various types of messages and their associated message type codes are shown in Tables I and II.

TABLE I

| CENTRAL CONTROLLER MESSAGES | | |
|---|---|---|
| Message Type | Type Code (41) | Data (42) |
| Refrigeration Control | 1 | 1 bit on/off |
| Door Reply | 01 | 5 bit door address<br>1 bit open/don't open |
| Control Acknowledge | 001 | None |
| Door Price | 0001 | 5 bit door address<br>12 bit price data |
| Access Code | 00001 | 20 bit password<br>1 bit password type |
| Time Update | 00000 | 10 bit time data |

TABLE II

| REMOTE MESSAGES | | |
|---|---|---|
| Message Type | Type Code (41) | Data (42) |
| Vending Unit Acknowledge | 1 | None |
| Door Request | 01 | 5 bit-door address |
| Service Access | 001 | 1 bit & access begins/end |
| Information Request | 000 | None<br>- |

It should be mentioned that the message type codes utilized are not of fixed length, but the number of bits in each code is determined by the type of message. The data field 42 is also of variable length and may, for certain messages, contain nothing at all. The final field is an error-checking field 43 by which the receiver of the message can detect if an error has occurred in the transmission of the message. The two FSK protocol fields 44 and 45 of FIG. 3 are incorporated by the head end transceiver 27 for messages from central controller 10 and incorporated by a vending unit transceiver 76 (FIG. 2) for messages from the vending units. These two initial fields comprise a preamble 44 consisting of twelve logical ones followed by a space 45 having a length of four digits.

When a message, except an acknowledgment message is transmitted from either the central controller 10 or a vending unit controller 75, the sending unit expects a response message in reply. The response message may either be a direct response such as an answer to a query or an acknowledgment message. When no response message is received by the sender within a predetermined period of time, the original message is re-transmitted up to 4 times. When a message is received by the controller 10 or a vending unit controller 75 the error code of the message is first checked to find out if the message was correctly received. No further action is taken for an erroneously received message and no response message is returned to the sender. As above described, the sender upon failure to receive a response, re-transmits the original message. Alternatively, when a message is correctly received its type code is decoded to determined how to respond to the received message and an appropriate response message is transmitted to the message sender. In the following description, it is assumed that all messages are correctly received unless specifically discussed otherwise.

The program and certain fixed data for the control of vending unit controller 75 (FIG. 2) is permanently stored in a ROM portion of memory 77 while certain variable information such as article prices and service personnel passwords is temporarily stored in a RAM portion of memory 77.

When a vending unit is initially powered up, its controller 75 does not have available to it all of the variable information required to function. On power up, the vending unit transmits to central controller 10 an information request message as identified in Table II. Central controller 10 responds to an information request message by transmitting to the requesting vending unit time of day information, the necessary pricing information and the password information required for the requesting vending unit to function.

Figure 4:
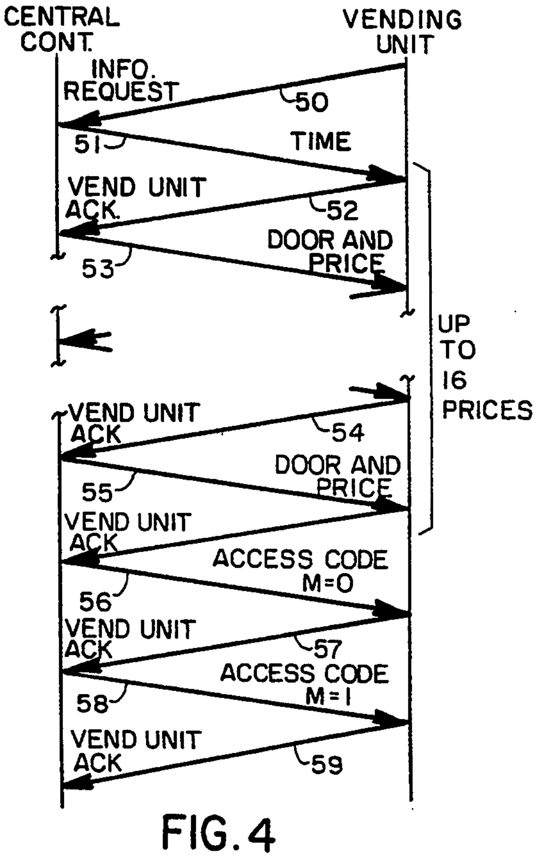
FIG. 4 is a message sequence diagram relating to information flow between units of FIG. 1.

The sequence of messages brought about an information request is shown in message sequence of FIG. 4. The sequence begins with the information request 50 from a vending unit, e.g., 11 to central controller 10. The central controller 10 recognizes the information request message and transmits to the requesting vending unit a time update message 51. The time update message is acknowledged by a vending unit acknowledgment message 52 from the vending unit. The sequence continues with a series of door price messages from the central controller 10 of which door price messages 53 and 55 are specifically shown. Each door price message is acknowledged by a vending unit acknowledgment message e.g., 54. For ease of understanding, only two of the sixteen possible door price messages are shown in FIG. 4. At the end of the door price messages and their acknowledgment, central controller 10 transmits to the requesting vending unit a message 56 identifying a first 20 bit access code (password) and including type information (M 20) defining it to be a maintenance access password. This message is acknowledged by the vending unit in message 57 which is followed by a message 58 containing a password for restocking access (M 21) to the vending unit. Receipt of the password for restocking access is in acknowledged in a message 59.

The time of day information is used by the display driver/clock circuit 61 to control display unit 35 to display current time. Each received door price message includes a price and the identity of the particular vending door to which the price relates (see Table 1. Vending unit controller 75 stores the door price data in memory 77 so that the price of articles behind each door can be determined. Similarly, the restocking access password and the maintenance access password are stored in memory 77 for use when service personnel attempt to gain access to the vending unit.

Figure 5:
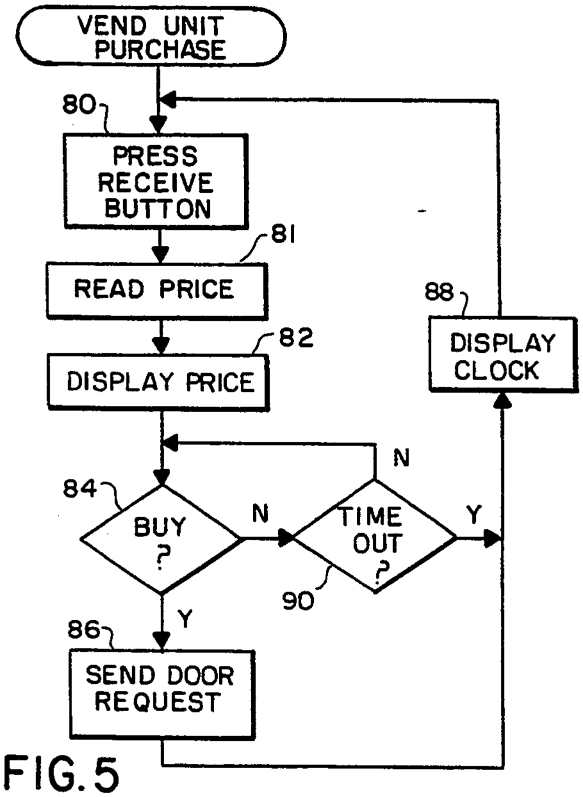
FIGS. 5 through 7 are flow diagrams of a vending operation.

After the necessary variable information has been stored in the memory 77 of the requesting vending unit, that vending unit can begin to communicate and perform its vending function in cooperation with the central controller 10. In the vending mode, a vending unit controller 75 is normally awaiting an input message or an input stimulus such as the press of a button on keyboard 38. Receipt of a button press stimulus is represented as block 80 of the flow chart shown in FIG. 5. It will be remembered that each of the vending doors 32 is imprinted with a number from 1 to 16 and that the keyboard 38 of vending units 11 through 15 includes 20 keys imprinted with the numbers 1 through 20. When a guest presses one of the buttons 1 through 16 the vending unit controller 75 senses the identity of the button pressed and reads, from the price table in memory 77, the price (block 81) associated with the vending door having the same number as the pressed key. In block 82, this price is transmitted to display driver/clock circuit 61 which displays the price on display unit 35. The control flow then awaits a purchase request 84 in a time out loop. It has been found advantageous to light a lamp 62 associated with the buy push button 36 during the time that an article price is displayed on display 35. Lamp 62 can be energized by display drives 61. When the purchase button 36 is pressed prior to the time out interval, a door request message is transmitted to central controller 10 in block 86 and the control flow returns to normal operation via block 88 in which the clock display is again enabled. If the purchase button is not pressed within the time out interval, block 90 times out and returns to the await mode 80 via the display clock block 88.

Figure 6:
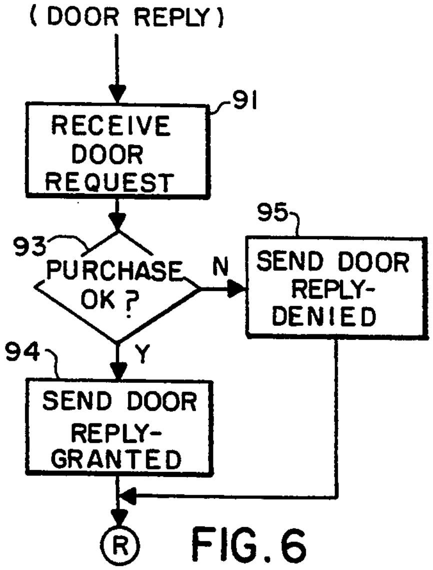

At this point in the sequence, the vending process continues in the host which is continually surveying incoming messages in block 91 (FIG. 6) to locate door request messages. When a door request message is received, block 93 is performed where a decision is made regarding whether the purchase should be permitted. Most purchases are permitted at most times, but a list is maintained within central controller 10 memory 16, identifying certain purchases which are not to be permitted. For example, the list may indicate that certain doors behind which alcoholic beverages are stored cannot be opened during particular periods of time or on particular days of the week. Also, it is possible that a parent with small children would request children not be permitted to purchase certain items from the vending unit. The identities of the doors behind which these items exist is stored on the list of non-permitted purchases. If block 93 determines that this is a permitted purchase, a door reply message is returned (block 94) to the requesting vending unit specifying the door and indicating that purchase permission is granted. Alternatively, if the purchase is not determined acceptable in block 93, a door reply message is returned (block 95) to the requesting vending unit indicating that the purchase is denied. The host returns to its operating system awaiting further stimuli after either block 94 or 95.

Figure 7:
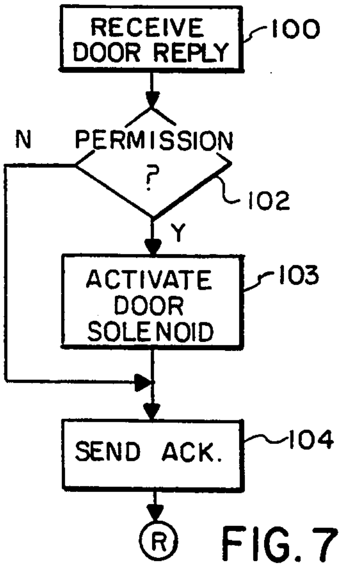
Figure 8:
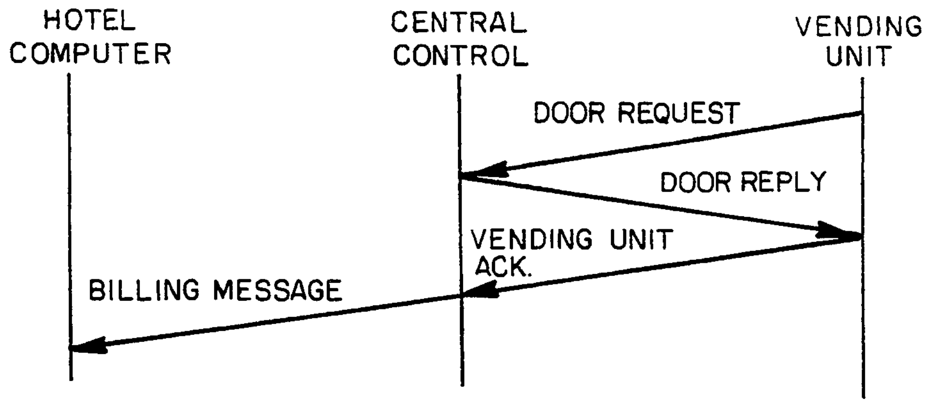
FIG. 8 is a message sequence diagram of the messages exchanged in a vending operation.

FIG. 7 represents the actions of the vending unit upon receipt of a door reply message in block 100. From block 100 the control flow proceeds to block 102 where a determination is made as to whether the door reply message grants or denies permission to open the door. When permission is granted the flow proceeds to block 103 where the solenoid of the door identified in the door reply message is activated allowing the identified door to open. After activation of the solenoid the flow proceeds to block 104 where an acknowledgment signal is returned to the central controller 10. When action block 102 determines the permission to purchase is denied, control flow goes directly to block 104 where an acknowledgment is returned to central controller 10 without activating the door solenoid. Upon receipt of the acknowledgment sent in block 104, central controller 10 determines that a purchase event was completed and, when the purchase was permitted, bills the guest room for the amount of the purchase as well as notifies the hotel management system computer 18 that the purchase occurred. FIG. 8 is a message flow diagram showing the exchange of messages between the central controller 10 and a vending unit e.g., 11 undertaken to complete a purchase.

Figure 9:
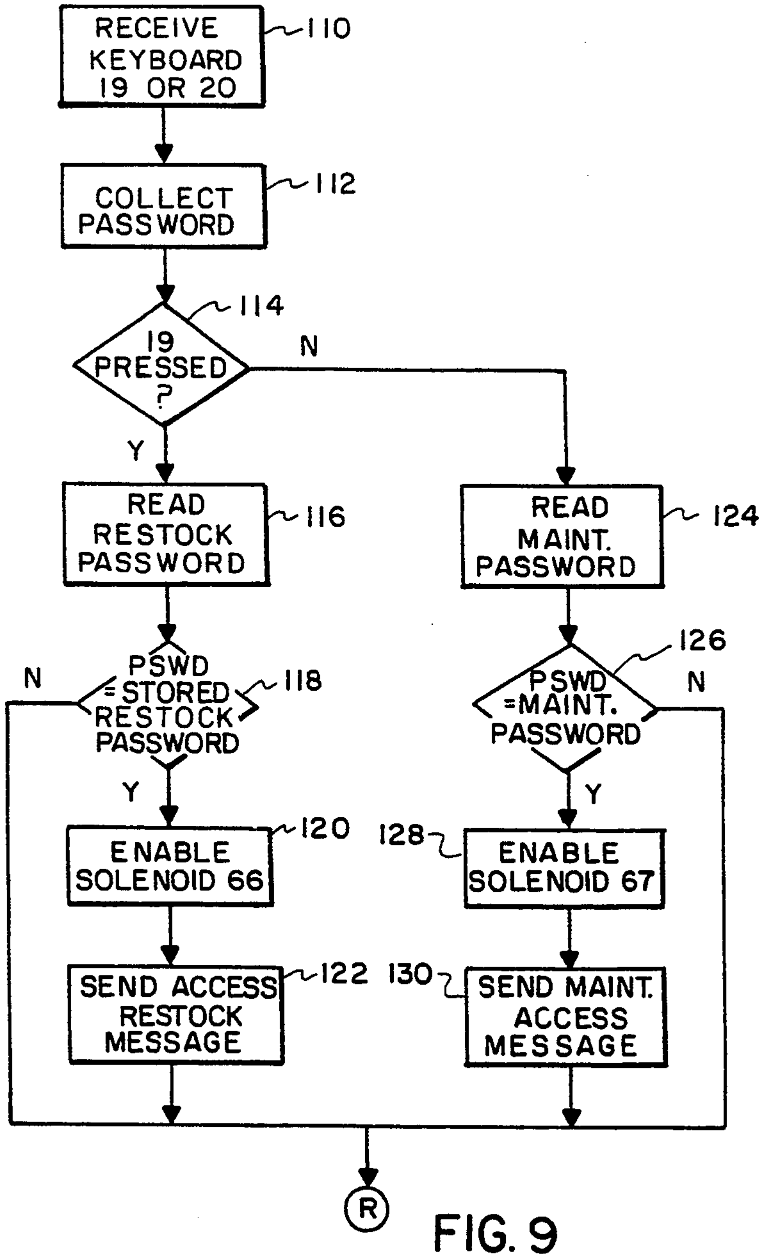
FIG. 9 is a flow diagram of password access to a vending unit.

FIG. 9 is a flow diagram showing the operation of a vending unit e.g., 11 in the grant or denial of service personnel access to the vending unit. It will be remembered that passwords were sent from central controller 10 to vending unit controller 75 and stored in memory 77 for both maintenance access and restocking access by service personnel (see FIG. 4). The flow of FIG. 9 begins at block 110 when it is detected that button 19 or 20 of keyboard 38 have been depressed. These buttons are predetermined to be requests for service access. The flow next proceeds to block 112 where vending unit controller 75 collects signals stimulated by service personnel interaction with keyboard 38 indicating the depression of four keys making up the actual password. After the password is collected in block 112, flow proceeds to block 114 where it is determined whether maintenance access or restock access is desired, based on whether key 19 or 20 was detected in block 110. If key 19 was originally pressed, restocking access is desired and the restocking password is read from memory 77 in block 116. The password received from the keyboard is then compared with the password from memory 77 in block 118 and if the two are equal, solenoid 66 is enabled in block 120 and a restock access message is returned to central controller 10 in block 122. If block 118 determines that the keyboard entry was not the same as the password stored in memory 77, the flow of control would have proceeded from block 118 to the operating system of vending unit controller where it awaits input stimulation.

When the keyboard key originally depressed was key 20, flow of control proceeds from block 114 along a path established to permit maintenance access to the vending unit. Initially, in block 124 the maintenance password is read from memory 77. In block 126 the maintenance password from memory 77 is compared with the collected password from the keyboard and if they are identical, solenoid 67 is enabled in block 128 and a maintenance access message is sent to central controller 10 in block 130. If the passwords do not match in block 126, control flow returns to the operating system of the vending unit controller 75 which awaits further stimuli.

The refrigeration control message shown in Table I is an important message for energy conservation purposes. At certain times during each day, central microcomputer 10 turns the refrigeration unit on or off in each of the vending units. This message also permits the vending unit to be turned off during times when no guest is occupying the room in question. The refrigeration control sequence begins with a refrigeration control message from the central controller 10 which message includes a 1-bit data field specifying that the refrigeration unit be turned on or off. The vending unit controller 75 receiving this message operates in accordance with the data field to turn the refrigeration unit 68 on or off via solenoid drive 63, and returns an acknowledgment message to the central microcomputer 10 to specifically identify that the action has been performed.

In the preceding embodiments, variable information concerning time of day, door pricing and passwords was transmitted as a part of a response to an information request message from vending unit controller 75. The time of day messages, door price messages and access code messages can also be transmitted from central controller 10 at any time. For example, when a service person is terminated it may be desirable to change the passwords in the vending units. This can be done by entering appropriate signals at keyboard 20 associated with central controller 10 which will transmit new access code messages to the vending unit controllers 75 of the various vending units. A vending unit receiving a new access code message merely replaces the old access code in its memory 77 with the newly received access code and all future access activities will be based on the newly received code.

The prices of articles stored by the vending units can also be changed at will from central controller 10 in response to operator signals generated at keyboard 20 or in response to stimuli determined from the normal operation of central controller such as time of day. For example, central controller 10 may include in its memory 16 more than one list of prices for vending units 11 through 15. At certain times during the day the price information in some or all of vending units 11 through 15 may be updated by selecting a different price list from memory 16 than was used to originally provide price information to the vending units. This would permit a happy hour throughout the hotel or at selective vending units of the hotel such as those on a concierge floor.

While a preferred embodiment of the invention has been illustrated, it will be obvious to those skilled in the art that various modifications and changes may be made thereto without departing from the scope of the invention as defined in the appended claims.

What is claimed is:

1. A hotel room vending network comprising:

a central control unit;

a plurality of vending units remote from said central control unit, each vending unit containing a plurality of vendable articles and comprising vending unit control means connected to said central control unit;

display means in each of said vending units;

said central control unit comprising means for transmitting price information representing the prices of a plurality of said vendable articles contained by at least one of said vending units to the vending unit containing those articles;

storage means in each of said vending units for contemporaneously storing price information for a plurality of said vendable articles received from said central control unit; and said vending unit control means comprises display control means responsive to operator interaction for retrieving price information from said storage means and controlling said display means to display the price of one of said vendable articles represented by said price information.

2. The network of claim 1 wherein each of said vending units comprises means for transmitting to said central control unit a price request signal requesting price information; and said central control unit comprises means responsive to said price request signals for transmitting price information to said requesting vending unit for storage thereby.

3. The network of claim 2 wherein each of said price request signals requests price information for all of the vendable articles contained by the requesting vending unit; and said central control unit responds to the price request signals by transmitting to the requesting unit price information representing the prices of all said vendable articles contained by the requesting vending unit.

4. The network of claim 7 wherein each of said vending units comprises a plurality of vending access means each for controlling access to an article contained by said vending unit and said transmitted price information comprises a price associated with each of said vending access means.

5. The network of claim 1 comprising means in said central control unit, for storing first price information associating first prices with the articles contained by said vending units and for storing second price information associating second prices with the same articles contained by said vending units; and said means for transmitting price information comprises means for transmitting to said vending units, price information selectively read from said first and said second stored price information.

6. The network of claim 5 wherein said central control unit comprises means for generating time of day signals; and said means for transmitting price information is responsive to said time of day signals for the selective reading of price information from said first and said second stored price information.

7. The network of claim 5 wherein each of said vending units is identified by a unique address; and said means for transmitting price information is responsive to the unique address of one of said vending units which is to receive price information, for the selective reading of price information from said first and said second stored price information.

8. A method of operating a hotel room vending system comprising a central control unit connected to a plurality of remotely located guest room vending units each including vending unit control means, the method of vending an article contained by one of said guest room vending units comprising:

transmitting from said one guest room vending unit to said central control unit a request to purchase an article contained by said one vending unit;

transmitting from said central control unit, in response to said request to purchase, a permission to purchase signal to said one guest room vending unit;

permitting, at said one guest room vending unit in response to said permission to purchase signal, the purchase requested in the request to purchase; and transmitting an acknowledgement signal from said one guest room vending unit to said central control unit upon completion of the purchase of said article.

9. The method of claim 8 further comprising recording the purchase of said article in said central control unit only after said acknowledgment signal is received by said central control unit.

10. The method of claim 8 wherein said one vending unit comprises display means and said method comprises:

receiving at said one vending unit, before the transmission of said request to purchase, a request to display the price of said article and displaying by said display means, the price of said article.

11. A hotel room vending network comprising:

a central control unit connected to a plurality of vending units;

said central control unit comprising means for generating a password for each of said vending units and means for transmitting each generated password to the vending unit associated therewith;

each of said vending units comprising a vending unit controller for receiving and storing in a storage means the password associated therewith;

input means at each vending unit responsive to operator action for generating signals representative of a password;

means at each vending unit for comparing said password signals with the password stored in said storage means; and means responsive to said comparing means for granting service access to the vending unit only when said password representing signals represent the password stored in said storage means.

12. The network of claim 11 wherein said central control means comprises means for transmitting a new password to selected ones of said vending units; and said vending unit controller comprises means for replacing the password stored in said storage means with said new password.

13. A method of operating a vending unit containing a plurality of articles to be vended and comprising a plurality of article push buttons each associated with one of said articles, a buy push button and a display means, said method comprising:

displaying, in response to the press of an article push button, the price of the item associated with the pressed article push button;

illuminating the buy push button at substantially the same time that the price is displayed in said displaying step;

terminating the display provided in said displaying step and the illumination of said lamp when said buy push button is not pressed within a predetermined period of time after commencement of said displaying step; and completing the vending of said article when said buy button is pressed within said predetermined period of time.

14. A hotel room vending network comprising:

a central control unit;

a plurality of vending unit containing a plurality of vendable articles and comprising vending unit control means connected to said central control unit;

said central control unit comprising means for transmitting password information to the vending units;

storage means in each of said vending units for storing password information received from said central control unit;

input means, at each of said vending units, responsive to operator action for generating service access request signals including password signals; and said vending unit control means is responsive to said service access request signals for retrieving said password information stored in said storage means and for selectively granting and denying service access to the vending unit.

15. The network of claim 14 wherein said vending unit control means grants service access to said vending unit only when the password signals represent the same password as said stored password information.

* * * * *

UNITED STATES PATENT AND TRADEMARK OFFICE

CERTIFICATE OF CORRECTION

PATENT NO. : 5,339,250

DATED : August 16, 1994

INVENTOR(S) : Durbin

It is certified that error appears in the above-indentified patent and that said Letters Patent is hereby corrected as shown below:

ON THE TITLE PAGE:

Item: [56] Change "Ungerman...221/97" to --Ungerman...221/7--.

IN THE ABSTRACT:

[57] Line 4 of the Abstract, change "rended" to --vended--.

[57] Line 10 of the Abstract, change "rended" to --vended--.

Column 10, line 65, change "7" to --3--.

Column 12, line 43, after "vending" insert --units remote from said central control unit, each vending--.

Signed and Sealed this

Third Day of January, 1995

Attest:

Bruce Lehman

BRUCE LEHMAN

*Attesting Officer* *Commissioner of Patents and Trademarks*